Figure 1:
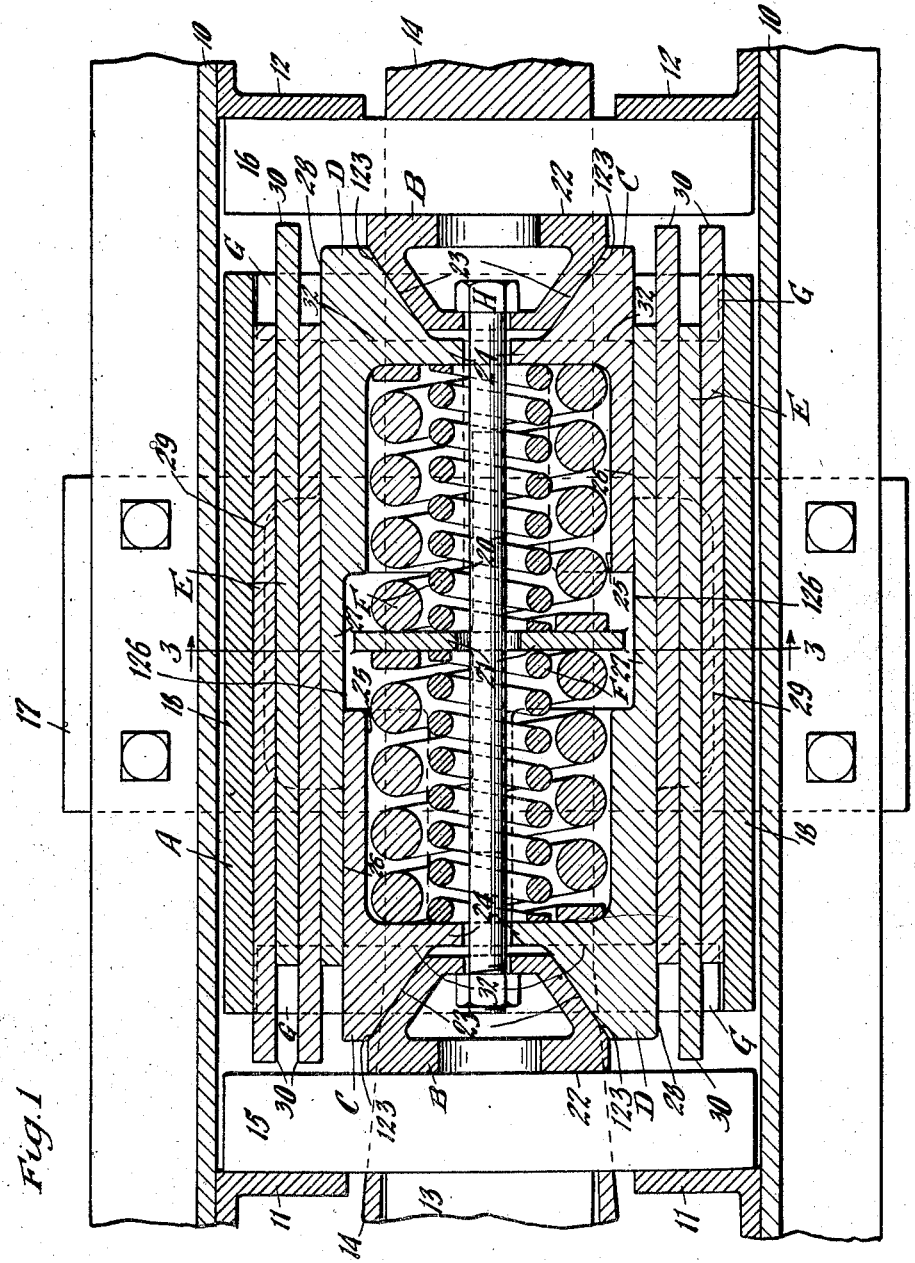

Sept. 29, 1925. 1,555,670
S. B. HASELTINE
FRICTION SHOCK ABSORBING MECHANISM
Original Filed May 14, 1924  2 Sheets-Sheet 1

Witness
Wm. Geiger

Inventor
Stacy B. Haseltine
By George I. Haight
His Atty.

Sept. 29, 1925.  
S. B. HASELTINE  
1,555,670  
FRICTION SHOCK ABSORBING MECHANISM  
Original Filed May 14, 1924   2 Sheets-Sheet 2
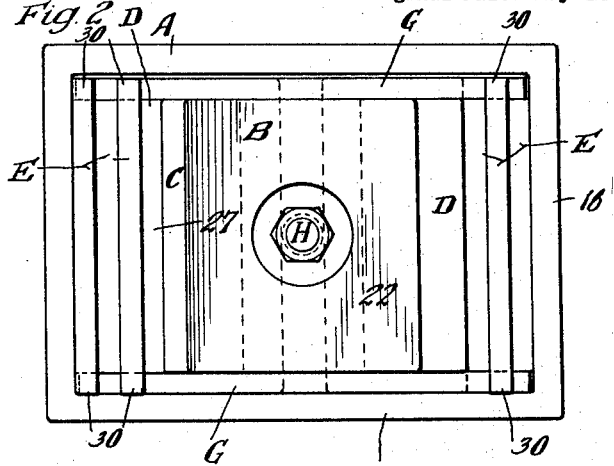
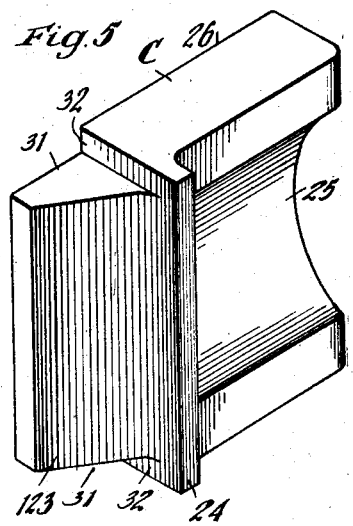
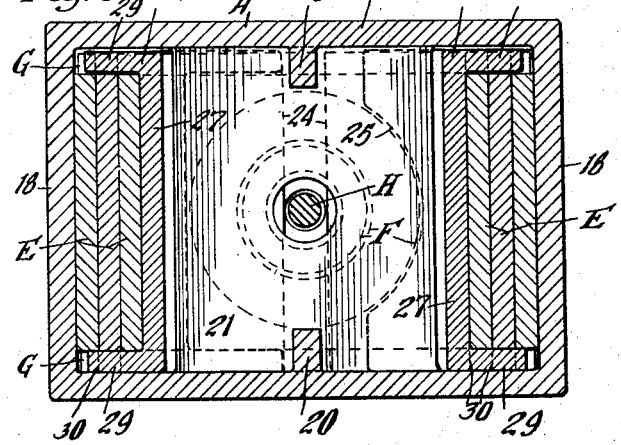
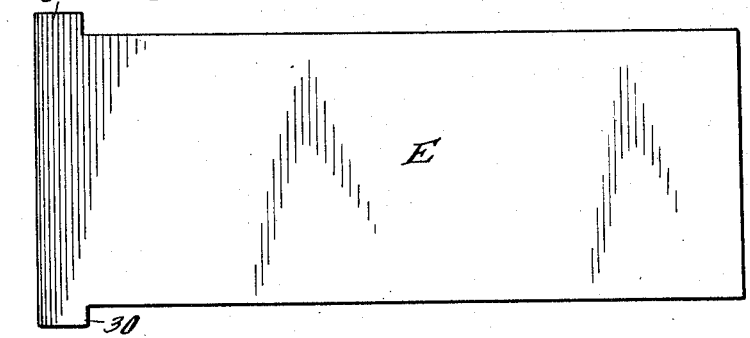
Witness  
Wm. Geiger
Inventor.  
Stacy B. Haseltine  
By George D. Haight  
His Atty Patented Sept. 29, 1925.

1,555,670

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed May 14, 1924, Serial No. 713,139. Renewed June 6, 1925.

*To all whom it may concern:*

Be it known that I, STACY B. HASELTINE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity friction shock absorbing mechanism of the intercalated plate type, especially adapted for railway draft riggings, having an initial relatively light action and high capacity frictional resistance during the remainder of the compression stroke.

Another object of the invention is to provide a mechanism of the character indicated, of the double ended type, including a plurality of relatively movable, intercalated friction plates, a friction shell housing the plates and a wedge friction means coacting with the plates for placing the same under lateral pressure, wherein the various friction elements are so arranged that release of the mechanism and restoration of the shell and other parts to central normal position will be assured.

A still further object of the invention is to provide a shock absorbing mechanism of the double ended type, comprising a group of relatively movable friction plates and friction wedge means for placing said plates under lateral pressure, including a pair of friction wedge shoes at each end of the mechanism, wherein one of the shoes of each pair is longer than the other and the long shoe of one pair and the short shoe of the other pair have inter-engaging friction surfaces, thus insuring greater distribution of the spreading pressure throughout the length of the plates.

Other objects and advantages of the invention will more clearly appear from the description and claims hereinafter following.

In the drawing forming a part of this specification, Figure 1 is a longitudinal, horizontal, sectional view of a portion of a railway draft rigging showing my improvements in connection therewith. Figure 2 is a front end, elevational view of the shock absorbing mechanism proper. Figure 3 is a vertical, transverse, sectional view of the shock absorbing mechanism proper, corresponding substantially to the line 3—3 of Figure 1. Figure 4 is a detailed, side elevational view of one of the friction plates used in connection with my improved mechanism. And Figure 5 is a detail, perspective view of one of the wedge friction shoes of said mechanism.

In said drawing, 10—10 denote channel shaped center sills of a railway car underframe, to the inner faces of which are secured front stop lugs 11—11 and rear stop lugs 12—12. The inner end portion of the drawbar is designated by 13, the same being operatively connected to a yoke 14 of well known form, within which are disposed the friction shock absorbing mechanism proper, a front follower 15 and a rear follower 16. The yoke and parts therewithin are supported in operative position by a detachable saddle plate 17.

The improved shock absorbing mechanism proper comprises broadly, a friction shell A; front and rear wedge blocks B—B; two similar friction shoes C—C; two similar friction shoes D—D; two groups of intercalated friction elements E—E; tandem arranged spring resistance elements F—F; two pairs of plate restoring bars G—G; and a retainer bolt H.

The friction shell A is in the form of a rectangular casting open at the front and rear ends and has spaced, longitudinally disposed side walls 18—18 and longitudinally disposed, spaced top and bottom walls 19—19, the side walls presenting longitudinally extending, interior friction surfaces adapted to coact with the outermost plates of the groups of friction elements E—E. The shell A is preferably of such a length that the front and rear ends thereof are normally spaced from the front and rear followers respectively, as clearly shown in Figure 1. Each of the walls 19 has on the inner side a longitudinally disposed central rib 20 having its front and rear ends spaced respectively inwardly from the corresponding ends of the shell, as most clearly shown in Figure 1. The opposed top and bottom ribs 20 maintain the spring resistance elements F in centered position, the bottom rib further acting as a support for the springs.

At the center, the shell A has a transverse, vertically disposed abutment wall 21 formed integral with the top and bottom walls 19 of the shell and having its opposed vertical edges equally spaced from the respective side walls 18 of the shell. The abutment wall 21 divides the shell into front and rear spring chambers or compartments.

The front and rear wedge blocks B are of like construction, each being in the form of a hollow casting and having a flat outer face 22 adapted to abut the inner surface of the corresponding main follower. Each block is also provided with a pair of wedge faces 23 disposed on opposite sides of the longitudinal center of the mechanism, converging inwardly thereof and adapted to co-operate with the adjacent set of friction wedge shoes C and D.

The four friction shoes C—C and D—D are arranged in pairs at opposite ends of the mechanism, each pair comprising a shoe C and a shoe D, the shoe C of one pair and the shoe D of the other pair being arranged on the same side of the mechanism. The four shoes C, C, D and D are of similar design, except as hereinafter pointed out. On the inner side, that is the side nearest the longitudinal central axis of the mechanism, each shoe has a wedge face 123 correspondingly inclined to and adapted to co-act with one of the wedge faces 23 of the corresponding wedge block B. At the inner end of the wedge face 123, each block has a vertically disposed, laterally projecting flange 24, and inwardly of the flange the corresponding side of the body portion of the shoe is recessed as indicated at 25 to accommodate the adjacent side of the outer coil of the corresponding spring resistance F. Each of the shoes C also has an outer longitudinally disposed friction surface 26 adapted to co-operate with the corresponding shoe D. The shoes D are appreciably longer than the shoes C, as clearly shown in Figure 1, each being provided with a vertically disposed, plate-like section 27 overlapping the corresponding friction shoe C, presenting a longitudinally disposed inner friction surface 126 engaging the friction surface 26 of the corresponding shoe C. Each shoe D also has an outer, longitudinally disposed friction surface 28 adapted to co-operate with the innermost friction plate of the corresponding group E. Along the top and bottom edges of each shoe D, are provided horizontally disposed, laterally outwardly projecting flanges 29—29 adapted to embrace the corresponding group of plates E, and act as top and bottom guides for the same. These flanges also serve as a stiffener-member and prevent buckling of the plates during compression. As shown in Figure 1, the flanges of each shoe D are shorter than the shoe, having their front and rear ends equally spaced inwardly from the corresponding ends of the shell when in normal free position.

As herein shown, two groups of friction plates E are employed, one group being disposed on each side of the mechanism. Each group is preferably composed of three like plates. The outer plate of each group has frictional contact with the inner surface of the corresponding side wall 18 of the shell and the innermost plate of each group frictionally engages the surface 28 of the adjacent wedge shoe D. As best shown in Figure 4, each plate E has top and bottom lugs 30 at one end thereof forming abutments adapted to coact with one of the pairs of bars G. The adjacent plates of each group are reversely arranged, the inner and outer plates having their lug-carrying ends disposed at one end of the mechanism and the intermediate plate having its lug-carrying end disposed at the other end of the mechanism. The two groups of plates are preferably reversely arranged also, one group having the lug-carrying ends of the inner and outer plates disposed adjacent the front follower and the lug-carrying ends of the intermediate plate adjacent the rear follower, while the other group has the lug-carrying ends of the inner and outer plates disposed adjacent the rear follower and the lug-carrying end of the intermediate plate disposed adjacent the front follower. As clearly shown in Figure 1, the lug-carrying end of each plate is preferably normally slightly spaced inwardly from the corresponding follower, while the opposite end of said plate is spaced some distance from the other follower. The plates are preferably of a length equal to the length of the shell A so that the front and rear followers will simultaneously engage the front and rear ends of the shell and the front and rear ends of all of the plates, when the mechanism is fully compressed. Alternate plates of each group are anchored to the front and rear pairs of shoes respectively by the bars G, one pair of bars being associated with each pair of shoes. One bar of each pair is disposed above and the other below the corresponding wedge and wedge friction shoes, the outer ends of the shoes C and D being cut away at the top and bottom as indicated at 31 to accommodate the respective bars. Transverse top and bottom abutment shoulders 32 are thus provided adapted to engage the bars to effect movement of the same outwardly with the shoes C and D. As clearly shown in Figures 1 and 3, the bars G are disposed transversely of the mechanism, the top and bottom bars of each pair respectively coacting with the top and bottom lugs 30 of the plates. In the normal position of the parts, the bars G abut the inner edges of the lugs 30 and maintain the respective plates properly spaced from the front and rear followers.

Each spring resistance element F comprises an inner light coil and an outer relatively heavy coil. The springs F are tandem arranged, one of the springs F being disposed at the forward end of the shell A, being interposed between the wall 21 and the flanges 24 of the front pair of shoes C and D, and the other spring F being interposed between the wall 21 and the flanges 24 on the rear pair of shoes D and C. It will be evident that the tandem springs bearing on the wall 21 of the shell A serve to properly center the shell after each compression stroke.

The parts of the shock absorbing mechanism are held in assembled relation and maintained at the proper overall length by the retainer bolt H extending through the inner coils of the spring resistance elements F—F and a central opening in the wall 21, and having its front and rear ends anchored in the recesses of the hollow front and rear wedges respectively. The bolt H also serves to maintain the mechanism under initial compression. As wear occurs on the various friction and wedge faces, compensation therefor will be had by the expansion of the spring resistance elements F, which, due to the initial compression, are free to expand to move the respective shoes outwardly.

The operation of the mechanism is as follows, assuming an inward or buffing movement of the drawbar. The front follower 15 will be moved rearwardly compressing the tandem spring resistance element F and thereby forcing the rear pair of wedge shoes C and D into wedging engagement with the rear wedge B which is held stationary by the follower 16. At this time, a wedging action will be set up between the front and rear wedges and shoes placing the friction plates under lateral pressure. As the rearward movement of the follower 15 continues, the front set of shoes will be moved rearwardly, the shoe C of the front set sliding on the friction surface 126 of the shoe D of the rear set and the shoe D of the front set sliding on the friction surface 26 of the shoe C of the rear set. At the same time, due to the friction between the parts, and the action of the tandem springs on the shell A through the partition wall thereof, the front follower will gradually approach the front ends of the plates of the groups E while the rear ends of the plates gradually approach the rear follower 16. During this action, the shoulders 32 of the front and rear pairs of shoes will be moved away from the corresponding bars G and the bars G will be freed from intimate contact with the lugs 30 of the corresponding friction plates E.

This action will continue until the front and rear followers respectively engage alternate plates of the two groups, whereupon the plates will be moved relatively to each other, greatly augmenting the frictional resistance offered. The described movement of the followers, plates and shell continues until the actuating force is removed or until the front and rear ends of the shell A and the plates E abut the front and rear followers, whereupon the force is transmitted directly through the shell, plates and followers to the rear stop lugs, the parts being so proportioned as to thereby prevent the springs from being driven solid. During draft, the action is substantially the reverse of that just described, the front follower 15 remaining stationary while the rear follower is moved toward the same.

Upon reduction of the actuating force, the wedging pressure will be relieved and there will be an initial release movement of the friction shoes and wedges, due to the bars G being spaced either from the shoulders 32 of the shoes or the lugs 30 of the plates during compression of the mechanism. An easy and quick release and certain reduction of lateral pressure on the groups of friction plates is thus assured. As the shoes at opposite ends of the mechanism move apart, due to the expansive action of the springs F, the shoulders on the respective shoes will come into engagement with the bars G, which in turn coact with the lugs 30 of the plates to restore the plates to normal position. In this connection, it is pointed out that the outermost plates of the respective groups move in opposite directions during release and therefore facilitate restoring the shell to normal central position.

I have herein shown and described what I now consider the preferred manner of carrying out my invention, but the same is merely illustrative, and I contemplate all changes and modifications that come within the scope of the claims appended hereto.

I claim:

1. In a friction shock absorbing mechanism, the combination with a plurality of longitudinally disposed, relatively movable intercalated friction plates; of means for laterally compressing said plates, including duplicate wedge pressure creating means at the opposite ends of the mechanism and a lateral pressure-resisting member, each of said duplicate wedge pressure creating means including a pair of friction wedge shoes, one of said shoes of each pair having frictional engagement with said plates, and the remaining shoe of each pair having frictional engagement with that shoe of the other pair which coacts with said plates; and a spring resistance coacting with said duplicate means.

2. In a friction shock absorbing mechanism, the combination with a plurality of longitudinally disposed, relatively movable intercalated friction elements; of means for placing said elements under lateral pressure, including a lateral pressure-resisting member and duplicate wedge pressure creating means at the opposite ends of the mechanism, each of said duplicate means including a pair of wedge friction shoes, one of said shoes of each pair having a friction plate section formed integral therewith, the plate section of said shoe of one pair being interposed between the friction plates and the other shoe of the other pair; and a spring resistance coacting with said duplicate means.

3. In a friction shock absorbing mechanism, the combination with front and rear follower means; of a floating friction shell interposed between said follower means; a plurality of relatively movable friction plates within said shell, said plates being divided into two groups at opposite sides of the mechanism and coacting with the respective side walls of the shell; a main spring resistance; duplicate spreading means at opposite ends of the mechanism, each of said duplicate means including a pair of friction wedge shoes, one of said shoes of each pair directly engaging the corresponding group of plates and the other shoe of each pair frictionally engaging the first-named shoe of the other pair.

4. In a friction shock absorbing mechanism, the combination with front and rear followers; of a floating friction shell interposed between said followers; a plurality of relatively movable friction plates within said shell, said plates being divided into two groups at opposite sides of the mechanism and coacting with the respective side walls of the shell; a main spring resistance; duplicate spreading means at opposite ends of said mechanism, each of said duplicate means including a pair of wedge friction shoes, one of said shoes of each pair having a friction section formed integral therewith, said section being interposed between one of said groups of plates and the remaining shoe of the other pair.

5. In a friction shock absorbing mechanism, the combination with front and rear followers; of a floating friction shell interposed between said followers, said shell having abutment means intermediate its ends; a plurality of relatively movable friction elements within the shell, said elements being divided into two groups at opposite sides of the mechanism and coacting respectively with the opposite walls of said shell, alternate elements of each group having their front ends normally spaced from said front follower and the remaining elements having their rear ends normally spaced from the rear follower; duplicate lateral wedge pressure creating means at opposite ends of said mechanism interposed between said two groups of elements, said duplicate means including front and rear friction wedge shoes, said front and rear shoes having co-operating friction surfaces; and tandem arranged spring resistance elements co-operating with said duplicate means, said tandem springs having their inner ends bearing on said abutment means.

6. In a friction shock absorbing mechanism, the combination with front and rear followers; of a floating friction shell interposed between said followers; a partition dividing said shell into front and rear spring cage compartments; a plurality of relatively movable friction elements within said shell, said elements being divided into two groups at opposite sides of the mechanism and coacting respectively with the opposite side walls of said shell; lateral wedge pressure-creating means at opposite ends of said mechanism interposed between said two groups of elements, each lateral wedge pressure creating means including front and rear friction wedge shoes, said front and rear shoes having co-operating friction surfaces; and a spring resistance element disposed in each of said cage compartments and coacting with the corresponding wedge pressure-creating means.

7. In a friction shock absorbing mechanism, the combination with front and rear follower means; of a floating friction shell interposed between said followers; a plurality of relatively movable friction plates within said shell, said plates being divided into two groups at opposite sides of the mechanism and coacting with the respective side walls of the shell, the outermost plate of one of said groups being reversely movable to the outermost plate of the other group, both during compression and release of the mechanism; a main spring resistance; and duplicate wedge spreading means at opposite ends of said mechanism, said duplicate means including front and rear wedge friction shoes having co-operating friction surfaces.

8. In a friction shock absorbing mechanism, the combination with front and rear followers; of a group of relatively movable friction plates interposed between said followers; spreading means at the opposite ends of said mechanism for placing said plates under lateral pressure, said spreading means being disposed at one side of said group of plates, said spreading means including front and rear friction shoes having inter-engaging friction surfaces; means disposed at the opposite side of said group of plates for resisting lateral movement thereof; and a spring resistance coacting with said spreading means.

9. In a friction shock absorbing mechanism, the combination with a group of intercalated, relatively movable, friction plates; of means engaging one side of said group of plates opposing lateral movement thereof; front and rear, lateral wedge pressure creating means disposed at the opposite side of said group of plates, said means including front and rear friction shoes having coacting friction surfaces; a main spring resistance; and relatively movable means directly coacting with said wedge pressure creating means and normally spaced from said plates for effecting relative movement of said shoes, and after a predetermined relative movement of said shoes also effecting relative movement of said plates, whereby a light preliminary and a heavy final frictional resistance is produced.

10. In a friction shock absorbing mechanism, the combination with a group of relatively movable, intercalated friction plates; of a member resisting lateral movement of said plates and having a friction surface coacting with one side of said group; front and rear friction wedge shoes, one of said shoes engaging the opposite side of said group of plates, said shoes having coacting longitudinal friction surfaces; a wedge pressure-transmitting member coacting with each shoe; a spring resistance; and relatively movable means engaging said wedge pressure-transmitting members to effect relative movement thereof and of said shoes, said means also cooperating with said plates and lateral pressure resisting member to effect relative movement thereof and also produce relative movement of the plates composing said group.

11. In a friction shock absorbing mechanism, the combination with front and rear followers, relatively movable toward each other; of a group of relatively movable friction plates interposed between said followers; spreading means at opposite ends of the mechanism for placing said plates under lateral pressure, said spreading means being disposed at one side of said group of plates and including front and rear wedge shoes, one of said shoes having an outer friction surface and the other shoe having a pair of longitudinally disposed friction surfaces coacting respectively with the friction surface of said first named shoe and the friction surface of the adjacent plate of said group; and a member disposed at the opposite side of said group of plates resisting lateral movement of the same; and a main spring resistance.

12. In a friction shock absorbing mechanism, the combination with front and rear followers; of a group of relatively movable, intercalated friction plates interposed between said followers and normally spaced therefrom and adapted to be engaged and actuated thereby after a predetermined relative movement of said followers; a wedge member cooperating with each follower; front and rear shoes coacting with said wedges, said shoes having inter-engaging friction surfaces and being disposed on one side of said group of plates; an abutment element on the opposite side of said group of plates; and a main spring resistance opposing relative movement of said shoes.

13. In a friction shock absorbing mechanism, the combination with a friction shell; of a plurality of relatively movable, intercalated friction elements within the shell; lateral wedge pressure creating means coacting with said plates, said means including relatively movable friction shoes having interengaging friction surfaces; a main spring resistance within the shell; and means for transmitting longitudinal pressure to said wedge pressure creating means and plates.

14. In a friction shock absorbing mechanism, the combination with a friction shell; of two groups of relatively movable, intercalated friction plates coacting with the shell; means for effecting relative movement of said plates; spreading means between said groups of plates for placing the same under lateral pressure, said spreading means including front and rear friction shoes, said front and rear shoes having interengaging friction surfaces; and a spring resistance coacting with said shoes.

15. In a friction shock absorbing mechanism, the combination with a friction shell having opposed, interior friction surfaces; of front and rear wedges; a pair of wedge shoes coacting with each wedge, the shoes of one of said pairs each having an extension overlapping the corresponding shoe of the other pair, the overlapping portions of said shoes having coacting friction surfaces; a main spring resistance coacting with said shoes; and a group of relatively movable, intercalated friction plates interposed between each of said friction surfaces of the shell and the corresponding friction shoes.

16. In a friction shock absorbing mechanism, the combination with a plurality of longitudinally disposed, relatively movable, intercalated friction plates; of means for placing said plates under lateral pressure, including wedge pressure creating means and a lateral pressure resisting member, said wedge pressure creating means including front and rear, relatively movable friction shoes having frictional contact with each other; means for yieldingly resisting relative movement of said shoes; and pressure-transmitting means coacting with said wedge pressure creating means.

In witness that I claim the foregoing I have hereunto subscribed my name this 9th day of May, 1924.

STACY B. HASELTINE.